July 15, 1924.  
E. I. FISHER  
TIRE CHAIN  
Filed June 22, 1923  
1,501,763
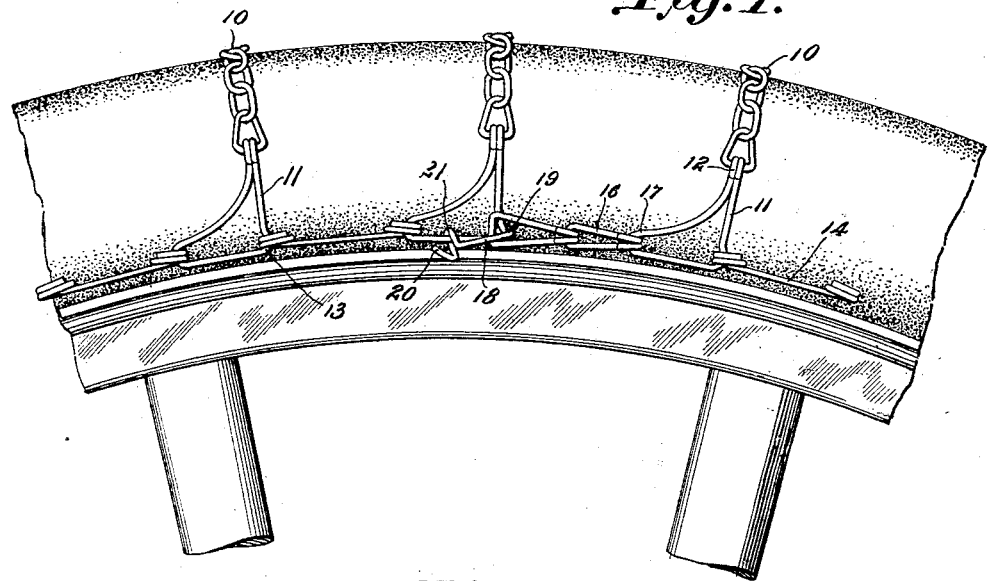
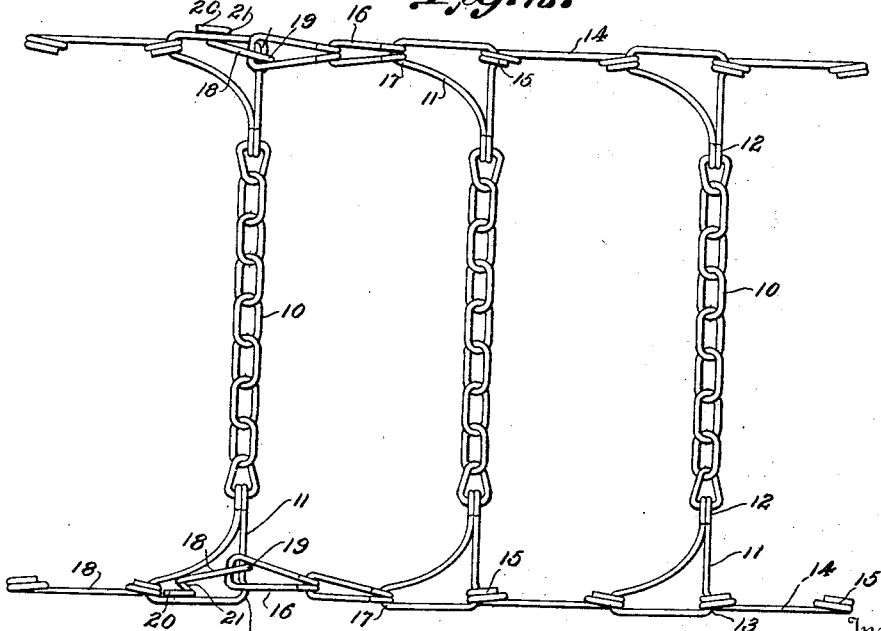
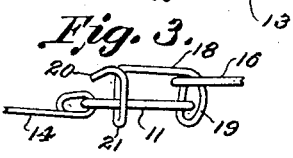
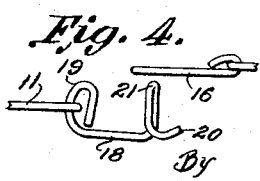
Inventor  
Ernest I. Fisher.  
By L. R. Morrill  
Attorney Patented July 15, 1924.

1,501,763

UNITED STATES PATENT OFFICE.

ERNEST I. FISHER, OF GEORGE, IOWA.

TIRE CHAIN.

Application filed June 22, 1923. Serial No. 647,054.

*To all whom it may concern:*

Be it known that I, ERNEST I. FISHER, a citizen of the United States, residing at George, in the county of Lyon and State of Iowa, have invented certain new and useful Improvements in Tire Chains, of which the following is a specification.

This invention relates to tire chains and has for an object to provide a chain with improved means for securing the chain in operative position upon the tire.

A further object of the invention is to provide a tire chain having triangular links with a tension exerting latch for exerting tension upon the chain to properly position the chain relative to the tire and to latch in conjunction with the triangular link in such manner as to be secure against displacement relative to the structure.

With these and other objects in view, the invention comprises certain novel parts, elements, units, combinations, constructions, interconnections, mechanical movements and functions, as disclosed in the drawings together with mechanical and functional equivalents thereof as will be hereinafter more fully described and claimed.

In the drawings:

Figure 1 is a view in side elevation of a fragment of a tire with the chain applied thereto showing the latch in closed position and side elevation.

Figure 2 is a plan view of the chain spread out showing the latches, one upon either side in different stages of latching or unlatching.

Figure 3 is a view in elevation of the latch on an enlarged scale, shown in latched position.

Figure 4 is a view in enlarged scale of the latch shown in unlatched position.

Like characters of reference indicate corresponding parts throughout the several views.

The improved tire chain which forms the subject matter of this application comprises a plurality of cross chain sections 10 extending over the curvature of the tire and specifically forming no part of the present invention, but the invention being capable of adapting itself to any form of cross chain.

The invention comprises a plurality of triangular links 11 connected with the cross chains by bringing the ends of the wire from which the links are formed together and forming loops 12. It will be noted especially from Figures 1 and 2 that the triangular links 11 extend laterally upon one side of the continuation of the cross chain 10, the other side being substantially in alignment therewith. Upon the lesser extended side a bend 13 is provided for the engagement of connecting links 14 which are preferably formed of single strands of wire or the like with double loops 15 formed as coils at their ends, embracing the wire of the triangular loops 11 and seated in the bends 13.

At the extremities of the chain, which are to be united for the purpose of applying the chain to the wheel, links 16 are attached to the triangular links 11 at the loop 17. One or more of such links 16 may be united in series according to the size of the wheel and the tension desired. The latter one of said links is adapted to co-act with the latch 18. The latch 18 is provided with an eye 19 loosely engaging the triangular loop at one extremity of the chain and at the opposite end is provided with a retaining coil having an extremity 20, approximately parallel with the shank of the latch and connected by an oval coil 21.

The latching extremity comprising the end 20 and the loop 21 are proportioned to be inserted through the extreme link 16, as shown at Figures 1 and 2, and at Figure 4 the relation of the latch and link are shown in position of release or the position about to be connected for the purpose of applying to the chain.

With the device shown with the parts as shown at Figure 4, the link 16 is slipped over the locking extremity until it engages against the shank of the latch 18 whereupon the latch is swung over to the position shown at Figure 3, exerting tension upon the link 16 as will be apparent. This position having been acquired to the extent shown at the bottom of Figure 2, the eye 19 of the latch is moved upwardly along the straight side of the triangular link 11 until the latching extremity will slide through the narrow part of the triangular link as shown at the bottom of said Figure 2. The latch extremity is then forced through this link and to the position shown at the top in Figure 2 whereupon by exertion in the opposite direction it is caused to snap over the base of the triangular link 11 to the position shown at Figure 1. Occupying this position, the eye 19 again slides back into engagement with the curve 13 and prevents unlatching of the device.

What I claim to be new is:

1. A tire chain comprising a plurality of cross chains terminating at their opposite ends in triangular links, means connecting some of said triangular links to form continuous parallel side chains, a latch member secured to the triangular link at one terminus of each side chain and slidable relative to one side of its said triangular link and latching against another side, and a link carried by the opposite terminus of the same side chain, proportioned to embrace and co-act with said latch.

2. A tire chain comprising a plurality of cross chains having their extremities provided with triangular links, the bases of which are substantially perpendicular to the length of said cross chains, links connecting said triangular links to form substantially parallel side chains, a latch having an eye embracing one of the sides of one of the terminal triangular links and having a locking extremity proportioned to be forced through an angle of said terminal link only when the eye has been moved away from its normal position, and a link carried at the opposite terminus of the respective side chain proportioned to embrace and co-act with said latch.

3. A tire chain comprising connected side chains having at one of their extremities each a triangular link, a latch having at one end an eye embracing a side of said triangular link and at its opposite end a coil proportioned to be forced through the angle of the triangle opposite the eye of the latch and only when the latch has been raised above normal position, and to return to normal position to embrace a side of said triangular link.

In testimony whereof I affix my signature.

ERNEST I. FISHER.